US008166500B2

(12) United States Patent
Sakhartov et al.

(10) Patent No.: US 8,166,500 B2
(45) Date of Patent: Apr. 24, 2012

(54) SYSTEMS AND METHODS FOR GENERATING INTERACTIVE VIDEO CONTENT

(75) Inventors: Eliot James Sakhartov, Burbank, CA (US); Royce Bradley D'orazio, Toluca Lake, CA (US)

(73) Assignee: Diggywood, Inc., Toluca Lake, CA (US)

( * ) Notice: Subject to any disclaimer, the term of this patent is extended or adjusted under 35 U.S.C. 154(b) by 647 days.

(21) Appl. No.: 12/125,509

(22) Filed: May 22, 2008

(65) Prior Publication Data

US 2009/0158317 A1 Jun. 18, 2009

Related U.S. Application Data

(60) Provisional application No. 61/014,385, filed on Dec. 17, 2007.

(51) Int. Cl.
*H04N 7/10* (2006.01)
*H04N 5/445* (2011.01)
(52) U.S. Cl. ............................... 725/32; 725/42; 725/60
(58) Field of Classification Search .................... 725/32, 725/42, 60
See application file for complete search history.

(56) References Cited

U.S. PATENT DOCUMENTS

| 2004/0039934 | A1* | 2/2004 | Land et al. ..................... 713/200 |
| 2005/0060759 | A1* | 3/2005 | Rowe et al. ..................... 725/143 |
| 2007/0143842 | A1* | 6/2007 | Turner et al. ..................... 726/22 |

* cited by examiner

*Primary Examiner* — Kieu Oanh T Bui
(74) *Attorney, Agent, or Firm* — Lewis Brisbois Bisgaard & Smith LLP; Jon E. Hokanson (57) ABSTRACT

The present invention is directed towards systems and methods for generating interactive content from video content. The method according to one embodiment of the present invention comprises identifying at least one product within the video content and converting the product into an interactive element within the video content. The method then assigns a plurality of controlling parameters to said at least one interactive element at least one of said controlling parameters includes outline identification indicia of said interactive element consistent with movement of the product within the video content and assigns a product information identifier with the product and retrievable via the controlling parameters. Finally the at least one interactive element is integrated onto the video, such that when the video is displayed, the displayed video includes the outlined interactive element therein.

16 Claims, 7 Drawing Sheets

SYSTEMS AND METHODS FOR GENERATING INTERACTIVE VIDEO CONTENT

RELATED APPLICATIONS

This application claims the benefit of Provisional Application No. 61/014,385, filed Dec. 17, 2007, entitled "System and method for changing existing and new video content to be become interactive on the internet for the purpose of advertising," the entire content of which is expressly incorporated by reference.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

Embodiments of the invention described herein generally relate to generating interactive content from video content. More specifically, embodiments of the present invention are directed towards systems and methods for providing a curvilinear, form-fitting interactive element generated from an existing video and providing an advertising framework associated with the interactive element.

BACKGROUND OF THE INVENTION

As the Internet expands, the importance and profitability of advertising has, in turn, increased proportionally. Originally, the methods of advertising on the Internet attempted to mimic that of traditional methods of advertising: the pop up ad, the banner ad, etc. But slowly, more sophisticated forms of advertising emerged such as interactive ads, Flash ads and video advertisements. These new forms of advertising focused on user interaction to generate greater revenues than that of traditional advertising methods; they tempted a user to participate in a manner other than simply clicking an ad and being sent to a landing page.

The current state of the art utilizes a plethora of interactive advertisements, ranging from simply interactive advertisements to highly complex advertisements such as Flash-based theme games. Additionally, injecting advertisements into existing content has begun to emerge as a lucrative source of advertisement revenue. For example, current video on a video sharing site may display a small banner ad on the video itself while the user views the selected video. Some advertisement schemes take this idea further and generate banner ads based on the video content itself, taking the old idea of targeted advertisement and applying it to a new medium.

However, in the current state of the art, advertisements are generally obtrusive or not fully integrated with the content itself. Thus, there exists a need in the art for a system and method for integrating interactive elements with existing video to create a new form of Internet media that seamlessly blends interactivity, advertising and content.

SUMMARY OF THE INVENTION

The present invention is directed towards systems, methods and computer program products for generating interactive content from video content. The method of the present invention includes identifying at least one product within the video content.

The method then converts the product into an interactive element within the video content and assigns a plurality of controlling parameters to the interactive element where at least one of the controlling parameters includes a curvilinear, form-fitting outline identification indicia of the interactive element consistent with movement of the product within the video content. In one embodiment, the controlling parameters further include parameters describing the movement of the interactive element. In an alternative embodiment, controlling parameters further include parameters describing advertising data associated with the interactive element. The advertising data may include data such as, an advertiser name, an advertiser bid price and advertiser billing information.

The method then assigns a product information identifier with the product that is retrievable via the controlling parameters and integrates the at least one interactive element to be viewable on the original video, such that when the video is displayed, the display includes the outlined interactive element therein. In one embodiment, the method further includes allowing advertisers to place bids including bid information on the interactive elements and associating the bid information with the interactive element. In another embodiment, the method includes monitoring user interaction with the interactive element wherein user interaction includes one or more of: a cursor click, a cursor over and a cursor down.

The system of the present invention includes a plurality of client devices coupled to a network and a content server coupled to the network, the content server operative to transmit and receive data to and from the client devices. The system further includes a video data store operative to store video data and an element extractor operative to identify at least one product within the video content.

Additionally, the system of the present invention includes an element generator operative to convert the product into an interactive element within the video content, assign a plurality of controlling parameters to the interactive element, the controlling parameters including curvilinear, form-fitting outline identification indicia of the interactive element. The identification is consistent with movement of the product within the video content. The controller assigns a product information identifier with the product that is retrievable via the controlling parameters. In one embodiment, the controlling parameters further include parameters describing the movement of the interactive element. In an alternative embodiment, controlling parameters further include parameters describing advertising data associated with the interactive element. The advertising data may include for example, data such as an advertiser name, an advertiser bid price and advertiser billing information.

The system further includes a merger device operative to integrate the at least one interactive element onto the video, such that when the video is displayed, the displayed video includes the outlined interactive element therein. In one embodiment, the content server is further operative to allow advertisers to place bids comprising bid information on the interactive elements and associating the bid information with the interactive element. In an alternative embodiment, the system further includes an interaction database operative to store user interaction data associated with the interactive element.

BRIEF DESCRIPTION OF THE DRAWINGS

The invention is illustrated in the figures of the accompanying drawings which are meant to be exemplary and not

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and design changes may be made without departing from the scope of the present invention.

Figure 1:
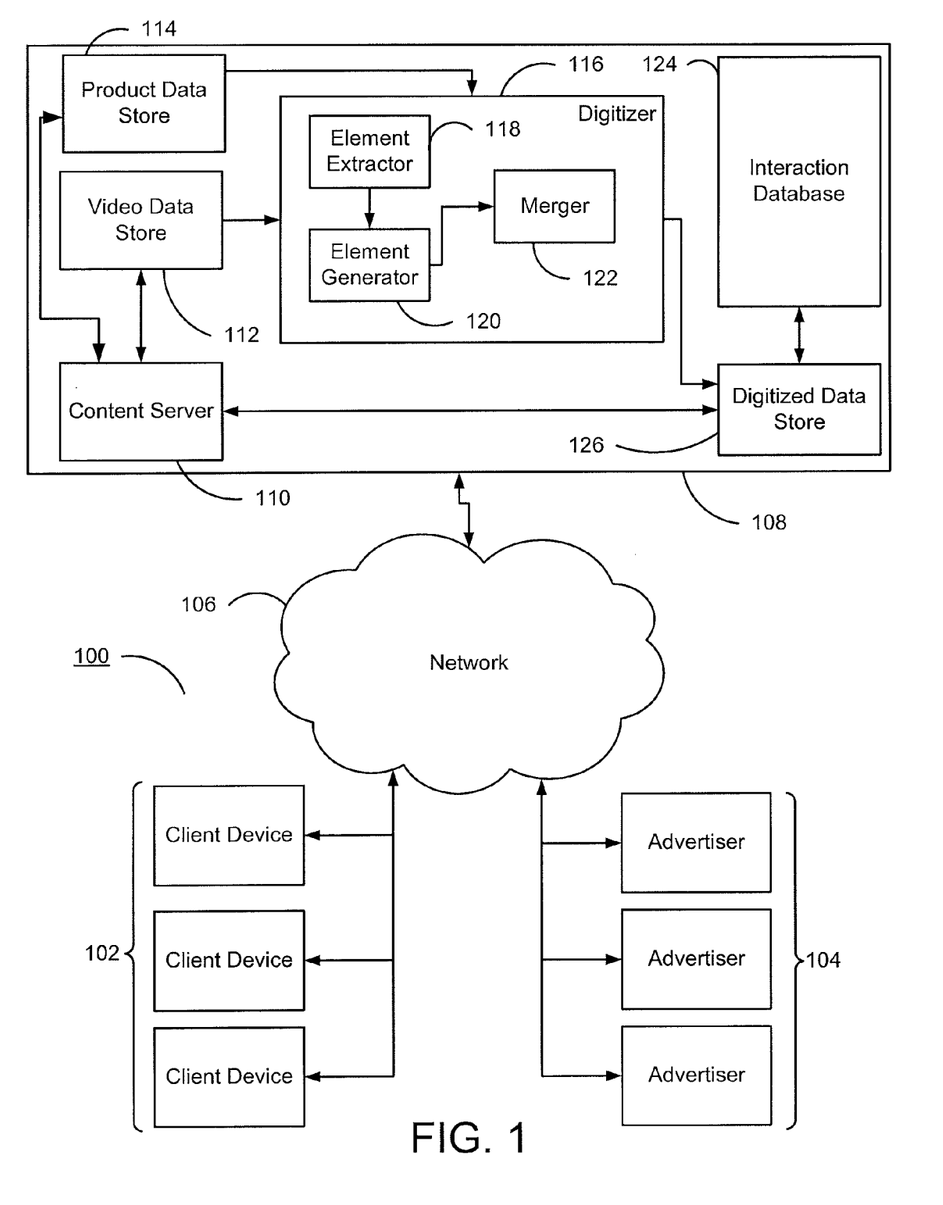
FIG. 1 presents a block diagram depicting a system for generating interactive video content according to one embodiment of the present invention.

FIG. 1 presents block diagram depicting a system for generating interactive video content according to one embodiment of the present invention. As illustrated, the system 100 includes a plurality of client devices 102 and a plurality of advertisers 104 coupled to a network 106. In the illustrated embodiment, a given client device 102 and advertiser 104 may include a general purpose user computer having a central processing unit, memory unit, permanent storage, optical drive(s), universal serial bus port(s), audio/video output devices, etc. In one embodiment, client devices 102 are operative to request and receive data from a content provider 108. In certain embodiments, data received from a content provider 108 may include graphic or video data including, but not limited to, images, audio, video or combinations thereof.

Content provider 108 includes a content server 110 which is operative to receive requests from a plurality of client devices 102 and advertisers 104 across network 106. Requests may include requests for content from a plurality of client devices 102 (e.g., a request for video content from content provider 108). Alternatively, or in conjunction with the foregoing, requests may include requests for advertising data (e.g., bids on advertising items). In one embodiment, advertisers 104 may be operative to place advertising bids on advertising elements provided by content provider 108 as will be described in further detail below.

Content server 110 is communicatively coupled to video data store 112 operative to store video data. In one embodiment, content server 110 may be operative to receive video data from a data provider (not shown) and store the received video data within video data store 112 for further processing. Content server 110 is additionally coupled to product data store 114 operative to store information related to products. For example, this may be price or sale information, hyperlinks to more data or any other suitable type of data usable as described herein.

Video data store 112 and product data store 114 are both communicatively coupled to digitizer 116. In the illustrated embodiment, digitizer 116 is operative to receive video data from video data store 112. As described in further detail below, processes are preformed on this video to effectuate context commerce applications.

Digitizer 116 includes an element extractor 118 operative to extract elements from a received video data object. Extraction includes product recognition using any number of available techniques, such as edge detection for example or a user using a software application to manually recognize products, as another example. In one embodiment, extracting elements from a video data object may include extracting product elements from a video data object based on a known or anticipated shape of the product. For example, video data from video data store 112 may contain a plurality of elements including an advertising element such as a soda can present in a given scene of the video data. Product data may identify that the soda can present within the video data includes an interactive element within the video data. Element extractor 118 is operative to identify this soda can element and extract the element from the video data for further processing. In one embodiment, extracting an element may include separating the element from the original video data and placing the extracted element on a layer separate from the original video data. In particular embodiments, extracted elements may include only the extracted elements, that is, the boundaries of a given element are limited to the natural outline of the extracted element, as opposed to a generic shape surrounding an entire element (e.g., creating a square "hotspot" around a curvilinear, form-fitting object versus a box, oval, amorphous field, etc.).

Digitizer 116 further includes an element generator 120 operative to generate a plurality of elements based upon element identification received from element extractor 118. In one embodiment, element identification received from the element extractor 118 may include an indication of the outline of a given identified element, as well as ancillary information such as that received from product data store 114. Element generator 120 is operative to add additional data to the received elements such as visual effects (e.g., a "glow" filter, "knockout" filter)/or identifying indicia (e.g., "id" tags, symbol names). The elements can be stand-alone elements including this additional data, known in an implementation vernacular as dwElements. As described in further detail below, these stand-alone elements are utilized in conjunction with the original video.

Digitizer 116 further includes a merger device 122 operative to merge the generated elements with the original video data. In one embodiment, merger device 122 may be operative to load a plurality of external video data files containing the previously identified elements and merge the plurality of external video data files with the original video data to generate a final interactive video data file. Alternatively, or in conjunction with the foregoing, merger device 122 may receive a plurality of cue-points indicating the start and end position of a given interactive element within the original video data file. Merger device 122 may further be operative to assign a plurality of cursor event handlers to the interactive elements including, but not limited to, "onclick", "onrelease", "onmouseover", "onmouseout" and "onmousedown" handlers, for example. It should be noted that the term "mouse", when used in event handlers such as "onmousedown" may refer to any generic cursor or pointing device, and is not intended to be limited to only a mouse device. As described in further detail below, the merger device 122 may also be the browser or viewer application when the incoming browser or viewer data feed includes the separate feeds of the original video and the interactive elements.

Digitizer 116 transfers finished, merged video data files to the digitized data store 126 in this embodiment. In the illustrated embodiment, digitized data store 126 may be a persistent storage device operative to store data subsequent retrieval at a later date. Although illustrated as residing within content provider 108, digitized data store 126 may reside in a device outside of content provider 108. Additionally, digitized data store 126 may be distributed across a plurality of remote devices (not shown) accessible via the medium 106. Digitized data store 126 is further coupled to interaction database 124. Interaction database 124 is operative to store information regarding user interaction within data stored within digitized data store 122. Examples of data stored within interaction database 124 include, but are not limited to, indication of clicks per data items, indication of dwell time on data items, load counts of data items and product conversion data for data items. Alternative embodiments exist wherein interaction database 124 may be coupled additionally to the content server 110.

Figure 2:
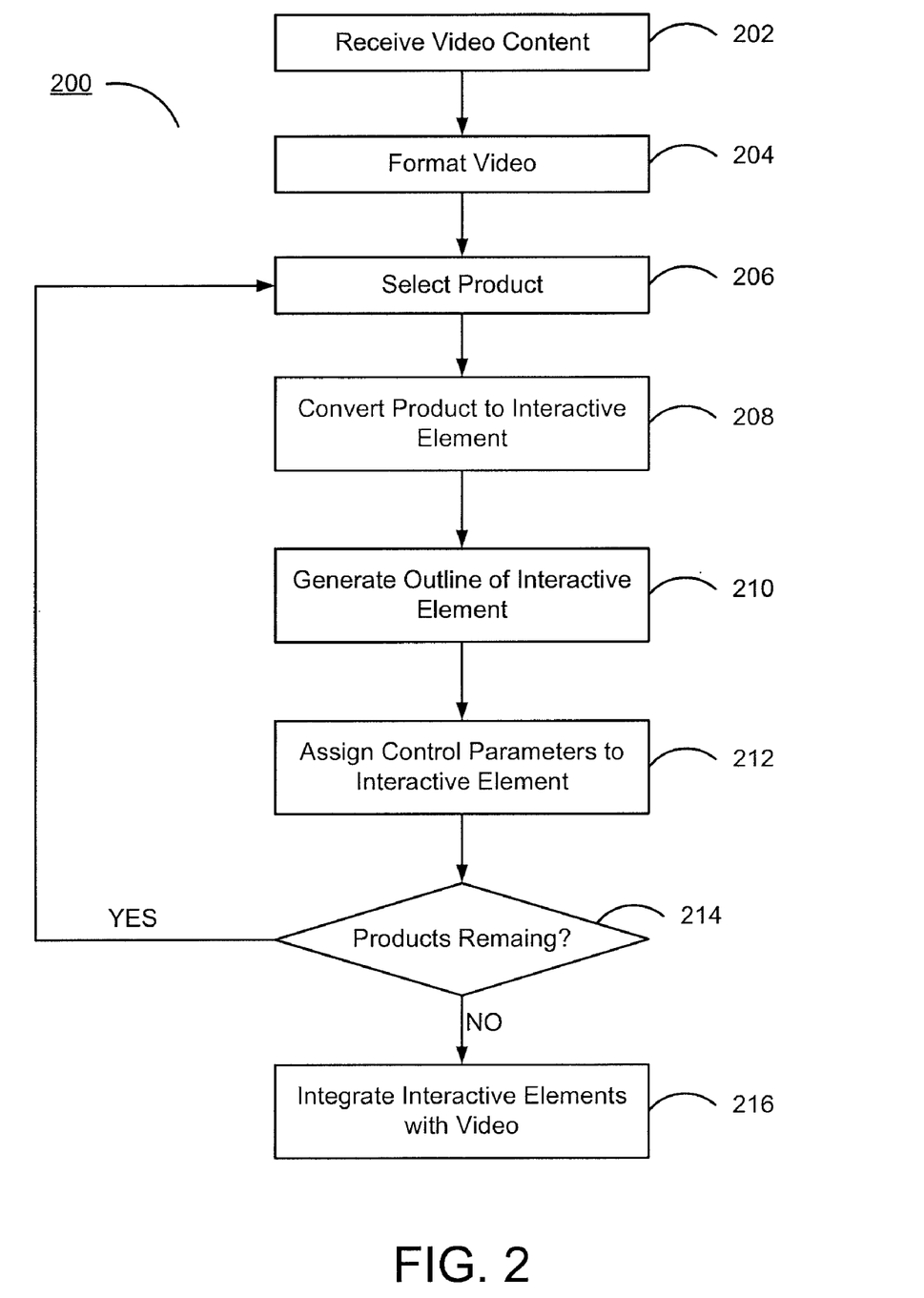
FIG. 2 presents a flow diagram for generating interactive video content according to one aspect of the present invention.

FIG. 2 presents a flow diagram for generating interactive video content according to one aspect of the present invention. As illustrated, the method 200 first receives video content, step 202. In one embodiment, received video content may include raw video content such as a commercial or other advertisement. For example, video content may include a non-interactive MPEG formatted video or similar video content.

In one embodiment, a next step, step 204, includes formatting the video. The format step includes converting various aspects of the video to a usable format consistent with design parameters for subsequent video processing operations. For example, formatting may relate to a defined size of the video, a quality level of the video, an encoding format, optimization routines or any other suitable formatting as recognized by one skilled in the art.

The method 200 selects a product, step 206, and converts a product to an interactive element, step 208. In the illustrated embodiment, an interactive element may be a digital representation of a product associated with the received video content. A digital representation may include video representations of a product, the video representations corresponding to the video representations of the product in the original received content. As described above, the product selection can be performed in any number of a possible techniques including product recognition software routines, edge detector operations, software-based user or manual operations, etc. In one embodiment, the conversion of the product to an interactive element, step 208, may include the association of the related information as well as a recognition of the tracking aspects of the object.

From a tracking perspective, different techniques may be utilized for different levels of accuracy. For example, one technique may include frame by frame recognition and placement definition of the recognized product. This frame by frame data may include a time-based indicator for each associated frame and within the associated frame, location information such as x, y, and z axis information. Other levels of information are also recognized, such as associated z-order information for other objects within a frame, such as the detection of partial or full occlusion. It is also recognized that outside of occlusion, other aspects affect visibility of elements, such as tracking the size of the object between frames, for example an object being in the frame forefront at a first time and in the back of a frame later time, with a significantly reduced visibility level in later frames. While the object technically is not occluded in this example, this additional element information relates to aspects of visibility. Other tracking aspects mat include different degrees of movement of the object, potential shape-morphing, resizing, etc.

The interactive element may also include a unique identifier assigned to it. This unique identifier may use any suitable type of naming nomenclature usable for additional processing operations as well as usable for subsequent video presentation options and options relating to advertisement or financial aspects associated with the object, as discussed in further detail below. The unique identifier is also useful because the interactive element is subsequently a self-contained data element that is independent of the video, its independence made possible based on location and movement information from the frame-by-frame analysis.

It is also recognized that based on the independence of data streams between the interactive element and the original video, it is possible to have a separate interactive element not apart of the original video, but rather an additional visual element added at a later point in time. One example may be a bug or static logo placed in a particular spot on the video. Another example may be the insertion of a new or replacement element, such as one example of including a new product placement in a video frame or another example being converting an object from a first product to a second product, e.g. converting a soda can from a Coke® can to a Pepsi® can.

The method 200 then generates an outline of the interactive element, step 210. In one embodiment, generating an outline of an interactive element includes "cutting" a product out of an original video, that is, selecting a product using a curvilinear, form-fitting path, as opposed to a polygonal path to approximate the area. In one embodiment, generating an outline of an interactive element may be performed manually; although alternative embodiments exist where generating an outline of an interactive element is preformed automatically by an image recognition or edge detector technique relative to the data acquired in the frame by frame analysis.

The method 200 then assigns a plurality of control parameters to the interactive element, step 212. In one embodiment, control parameters include, but are not limited to, parameters such as event handlers, element ids, element hyperlinks, etc. Examples of event handlers may include, but are not limited to, "onclick", "onrelease", "onmouseover", "onmouseout" and "onmousedown" handlers. Alternatively, or in conjunction with the foregoing, control parameters may include parameters controlling the appearance or navigation of an interactive element (e.g., tween path, visual effects such as a halo effect or colored effect or the absence of a visual effect, that is, an invisible halo allowing the element to blend into the original video).

In step 214, the method 200 includes the determination if there are any products remaining to be converted into interactive elements from the video. This step may be a step performed by a user controlling a software application. In another embodiment, an automated technique may include a list of noted products for a particular video and the determination consists of a binary check if all the products have been determined. By way of example may be a video relating to a portion of a reality tv show and the video is to be analyzed for four product placements, therefore step 214 may even be the determination if all four products have been processed.

If the answer to step 214 in the affirmative, meaning more products remain, the method reverts back to step 206. Else, step 216 includes the later step of integrating the interactive elements with the video. As noted above, the interactive elements can be stand-alone elements, therefore the integration includes a browser or other type of viewer application that allows for the visible overlay of these two components, the original video and the interactive elements. Based on the accuracy of the original position recognition and the other data of the interactive element, the overlay should be a seamless operation whereby if the visual queue is included, the user can see the differences, else the interactive elements are in the same position of as original elements, presenting the same video display as the original video. It is the noted here it may be the display of the video that is similar, but the overlay with the interactive elements provides a significant level of improved user interactivity allowing a user to perform different contextual operations on these interactive elements, for example click on the element and be presented with a chance to directly purchase the item.

Figure 3:
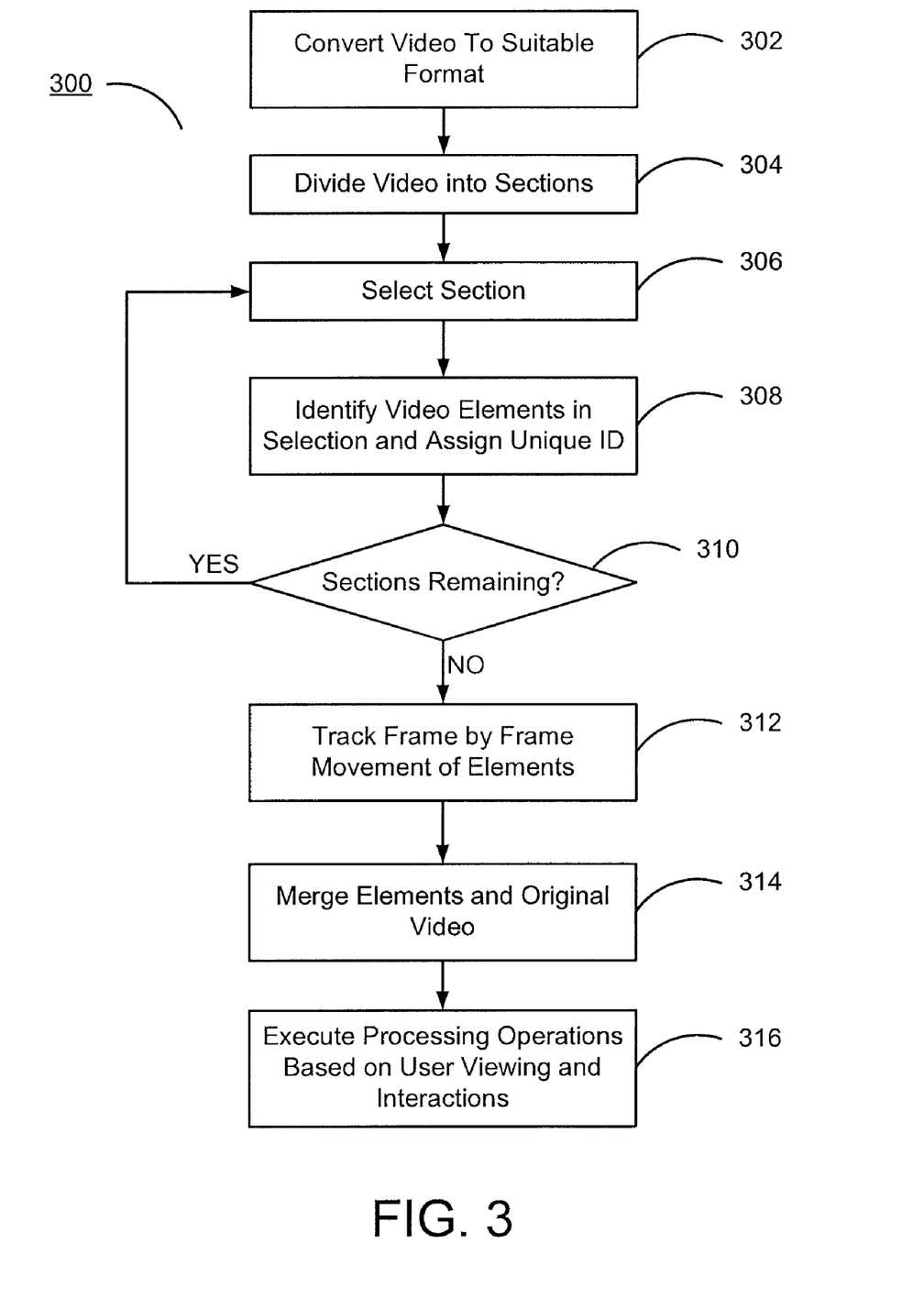
FIG. 3 presents a flow diagram for embedding interactive elements within existing video content according to one aspect of the present invention.

FIG. 3 presents a flow diagram for embedding interactive elements within existing video content according to one aspect of the present invention. According to the illustrated embodiment, the method 300 converts a video file to a suitable format, step 302. Exemplary formats include, but are not limited to, MPEG, WMV, AVI, etc. In one embodiment, features formatted in step 302 may comprise size, quality, encoding and Internet optimization aspects of the received video file.

The method 300 then divides the video into a plurality of sections, step 304. In one embodiment, dividing a video into a plurality of sections may include dividing a video into a plurality of section based on a predetermined partitioning scheme (e.g., a fixed duration section time). In an alternative embodiment, sections may correspond to scenes of the original video (e.g., sections sharing a common theme or background). In yet another embodiment, a section may correspond to a section of video determined to fall within two events (e.g., sections of video in between commercials).

The method 300 then selects a video section, step 306, and identifies video elements within the selection and assigns each video element with a unique ID, step 308. In one embodiment, identifying video elements may include manual identification of video elements in accordance with a plurality of video elements identified by a video creator. For example, Company A may provide the discussed video and additionally may indicate what aspects of the video comprise an interactive element. In response, a human editor may manually identify the provided elements within the video and assign the element a unique ID. The method 300 then determines if any sections of the video remain, step 310. If sections remain, the method repeats steps 306 and 308 for the remaining sections.

If all sections have been analyzed, the method 300 tracks the frame by frame movement of the identified elements, step 312. In one embodiment, tracking an element frame by frame may include recording data frame by frame related to the elements movement and storing the data within the video file. For example, for each frame an element is in, data corresponding to the "z-order" of the element may be stored; this data indicates when the element is visible or possibly occluded. Additionally, data corresponding to the frame by frame movement may comprise data identifying potential shape-morphing, re-sizing and other changes known in the art.

The method 300 then merges the identified elements with the original video, step 314. In one embodiment, merging the identified elements may include layering the identified elements onto the original video. For example, identified elements may reside within a separate video file associated with each element. In the merging process, the separate videos are aggregated and combined to form the final video. In one embodiment, the merger of these two data streams (the interactive elements and the original video) may be done before hand prior to transmission to the viewer or in another embodiment the viewer may include the capability to actively display both data streams in a seamless presentation.

The method 300 then executes processing operations based on user viewing and interactions, step 316. Executing processing operations based on user viewing and interactions may comprise providing a merged video to a user and recording data to a remote server based upon user interaction (e.g., view time, number of clicks, elements clicked, etc.).

Figure 4:
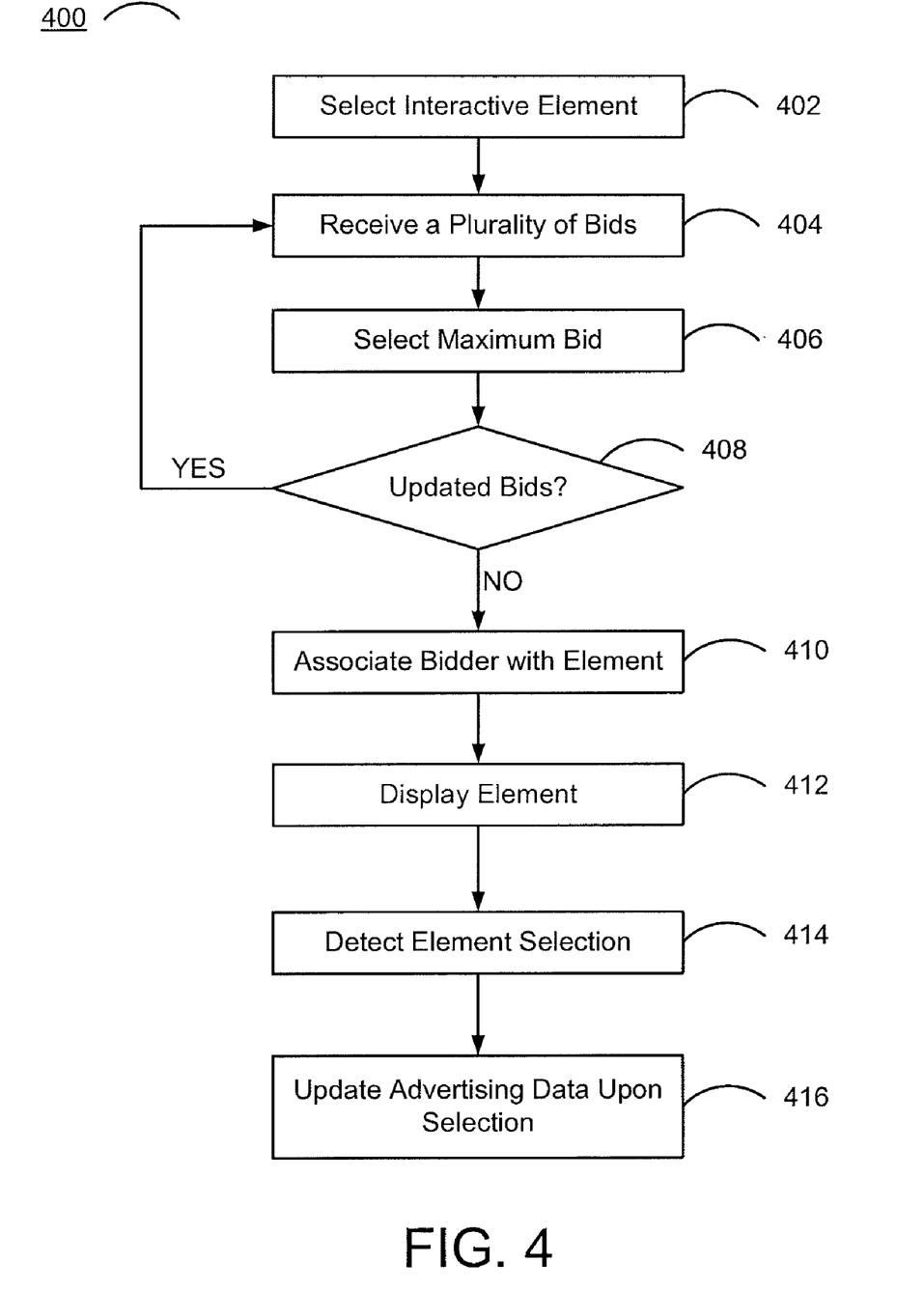
FIG. 4 presents a flow diagram for providing an advertising framework for use with interactive video content according to one embodiment of the present invention.

FIG. 4 presents a flow diagram for providing an advertising framework for use with interactive video content according to one embodiment of the present invention. According to the illustrated embodiment, the method 400 selects an interactive element, step 402. In the illustrated embodiment, an interactive element may include an interactive video element such at the interactive element discussed with respect to FIGS. 2 and 3.

The method 400 then receives a plurality of bids from a plurality of advertisers, step 404. In one embodiment, receiving a plurality of bids may include receiving a plurality of bids from advertisers through an electronic communications channel over a network such as the Internet. For example, an advertiser may place a bid by accessing a website using an Internet browser and selecting the interactive element he or she wishes to bid on. It is also recognized that the system can provide for different advertising cost structure techniques to be bid upon. For example, bidding may be based upon a cost per click, a cost per view, a permanent placement of an interactive element (e.g. a bug), or any other suitable cost structure recognized by one skilled in the art.

The method 400 then selects a maximum bid, step 406. In one embodiment, upon selecting a maximum bid, the method 400 may alert bidders as to the maximum bid and may recheck the plurality of bids to determine if any bids have been updated, step 408. In one embodiment, alerting bidders about the maximum bid may include alerting the bidders via a dynamic webpage loaded into an advertiser's browser. Alternatively, or in conjunction with the foregoing, alerting a bidder may include sending the bidder a message via phone, SMS, e-mail or any other communication means known in the art.

If the method 400 determines that the maximum bid has been obtained (step 408), the method 400 associates the highest bidder with the selected interactive element, step 410. In one embodiment, associating a bidder with an interactive element includes storing a database record indicating the association between bidder and element. In an alternative embodiment, associating a bidder with an interactive element includes storing bidder information within the parameters associated with an interactive element. Association data indicating the association between bidder and element may include, but is not limited to, bidder name, bid price and bidder billing information.

The method 400 then displays the interactive element, step 412. Although illustrated as occurring immediately after the step of associating a bidder with an element, it is recognized that this step occurs when a video is being viewed. In one embodiment, displaying the interactive element includes displaying the interactive element within the context of a video presentation, e.g. such as when the video and overlay data is downloaded from a storage web location and viewed by a browser application. In one embodiment, link information is stored in a database that allows for tracking of payments and top bids in a bidding process, as well as the location of links associated with the interactive elements. In a network environment, existing interconnectivity and routing protocols may be used to track click activities with the tracking of this information, such as tracking the number of times an element is selected for an accounting for a cost per click advertisement cost structure.

The method 400 includes detecting the selection of a selected interactive element, step 414, and update advertising data upon the selection of the interactive element, step 416. In one embodiment, detection of an interactive element includes, but is not limited to, detecting user interaction such as cursor clicks, cursor downs and/or cursor overs. As previously described, the method 400 is operative to update advertising data upon selection of the interactive element. Advertising data may include any data related to the management of advertising clients and revenue. For example, advertising data may track the number of times an item was clicked, the conversion (e.g. sale) rate of a given item and the revenue generated by the interactive element for billing purposes. Aside from the detection, the selection of the link also generates user-beneficial operations, such as presenting the customer with more information on a product, advancing the user to a check-out scenario for immediate purchasing, adding the item to an electronic shopping cart, by way of example.

It is also recognized that the distribution of the video with interactive elements is not strictly limited to web-based transmissions. For example, with the functionality of the selectability of the interactive elements through a browser, the data feed may be provided from any suitable type of storage device, such as a promotional DVD included with product, for example a complimentary copy of a television show sold with a product that includes product placements in the television show, such that as the user is watching the complimentary DVD, the user can engage in commercial activities, in the example where the user is watching the DVD on a computer connected to the internet. Another distribution example may be the broadcast of content to a television set top box using existing bi-directional data feed operations such as found in current digital cable installations.

An additional embodiment may include further resultant operations based on the user selection of an interactive element. While not expressly illustrated in the figures, this embodiment may include additional back-end directions or instructions associated with the interactive elements, in this embodiment the directions relating to additional aspects of a story. Stated another way, the interactive elements may provide for a user to engage in an interactive story-telling operation, a computerized "choose your own adventure."

In this embodiment, a storyline may be interspersed with various optional or user-selectable scenes. The interactive elements may be generated in a fashion consistent with the technique described above and the user selection of the interactive elements may redirect the storyline, e.g. cause the presentation and display of a selected scene. This embodiment includes the interactive element being linked to a new set of interactive displays, e.g. the selection of the interactive element may access particular scenes or storylines. By way of example, a scene may include two doors (by way of example an outside door and interior door), both doors being interactive elements. The selection of one door may direct the storyline in a first direction, for example in the story the person walks through the outside door. The storyline may lead in another direction if the person walks through the interior door, e.g. selecting the interactive element of the interior door. The underlying scene structure, for example a branch or tree structure, may use known linking technology, but the present embodiment uses the interactive elements to provide an additional interactivity whereby the viewer can direct the story line navigation.

Figure 5A:
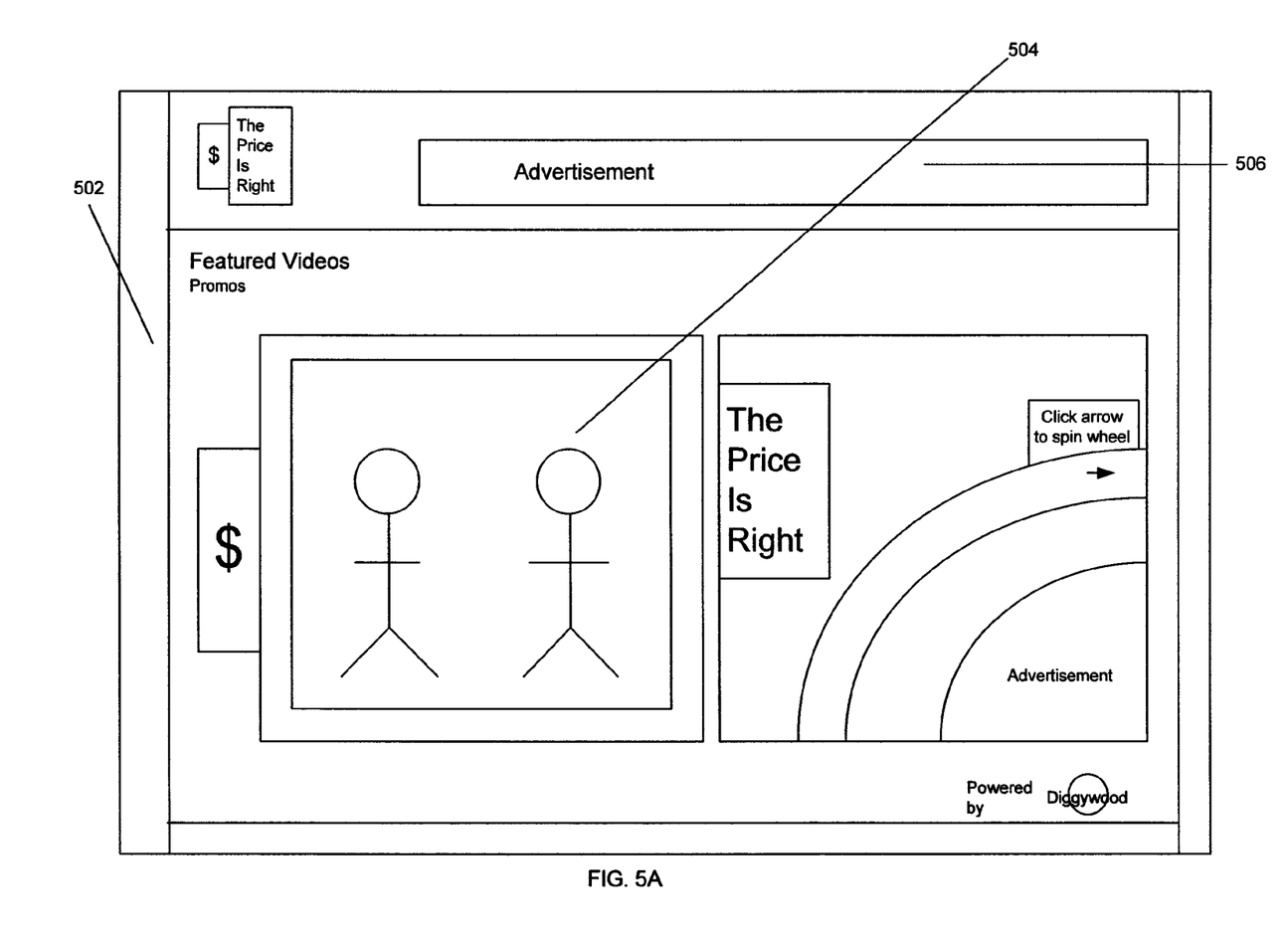
FIGS. 5A-C present screen diagrams illustrating a system for providing interactive video content to a user according to one embodiment of the present invention.
Figure 5B:
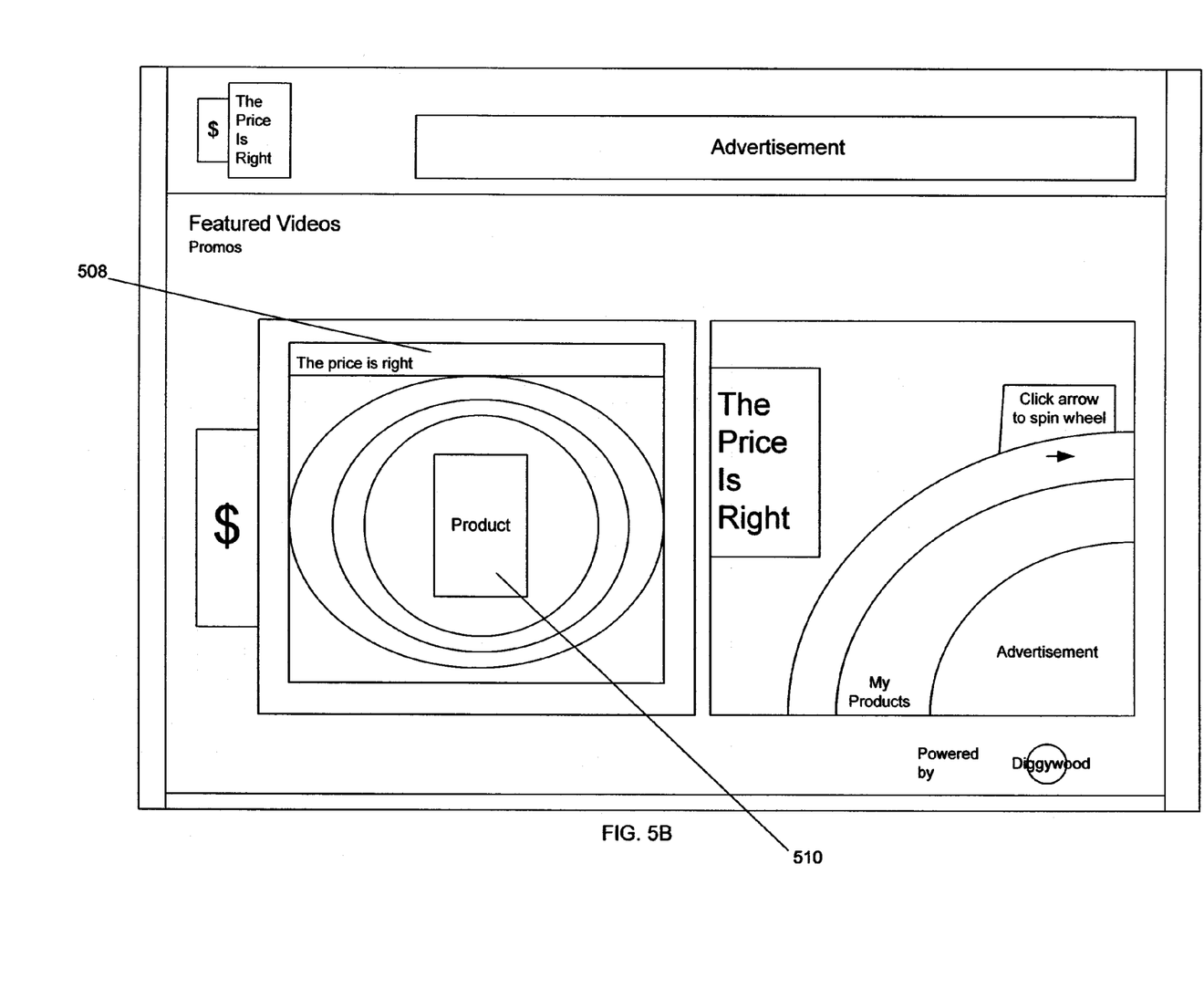
Figure 5C:
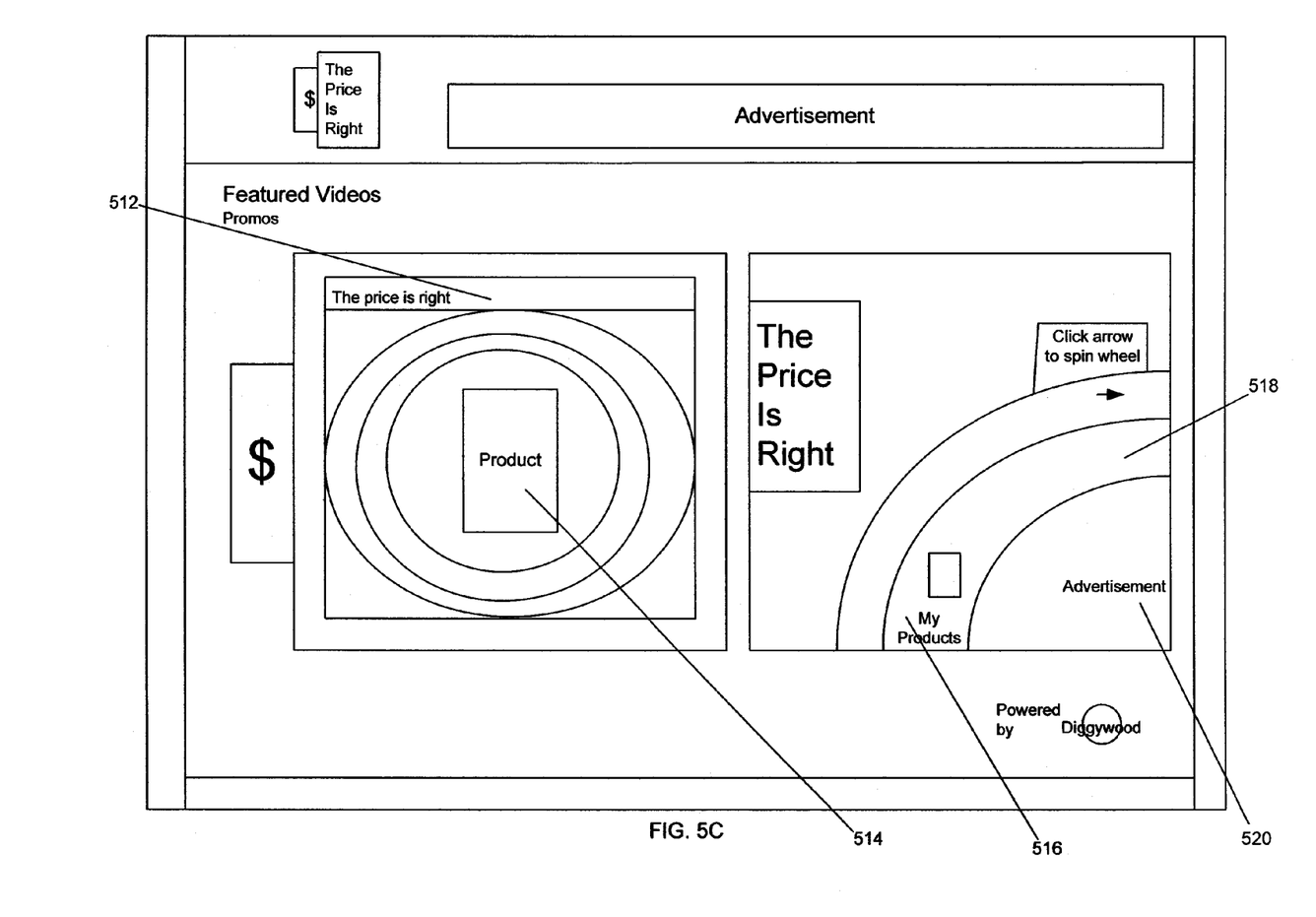

FIGS. 5A-C illustrate screen diagrams illustrating a system for providing interactive video content to a user according to one embodiment of the present invention. FIG. 5A illustrates an application 502 comprising a video 504. In the illustrated embodiment, application 502 may be a Flash-based animation comprising a plurality of interactive items 506. In alternative embodiments, the present invention may only provide the video element 504 to a user.

FIG. 5B illustrates an interactive video 508 containing an interactive product element 510. In the illustrated embodiment, interactive element 510 includes a curvilinear, form-fitting element responsive to user interaction. In one embodiment, the interactive element 510 may be a Flash object (e.g., a movie clip) embedded within a larger Flash application including a FLV-encoded video. The interactive element may be assigned a plurality of even handlers to respond to user interaction such as clicks, mouseovers and mouseouts. In the illustrated embodiment, it should be noted that video 508 containing product element 510 appears identical to a non-interactive version of video 508. The interactive element 510 may appear identical to the original video, but in the video 508, this element is an interactive element 510 merged into the video display 508.

FIG. 5C illustrates an interactive application in response to user interaction. As illustrated, the application contains an interactive video 512 containing an interactive product element 514, as previously discussed with respect to FIG. 5B. FIG. 5C illustrates an embodiment of a response to user interaction with interactive element 514. As illustrated, in response to the selection of interactive element 514, a product icon 516 is placed within product area 518. Additionally, a shopping cart icon 520 is presented to the user. In one embodiment, in response to the selection of shopping cart icon 520, a user may be given an option to purchase the selected product icon 516.

FIGS. 1 through 5 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A method for generating interactive content from video content, the method comprising:
    identifying at least one product within the video content to provide an identified product;
    converting the identified product into an outlined interactive element within the video content by
    first, assigning a plurality of controlling parameters to said identified product, at least one of said controlling parameters including curvilinear, formfitting outline identification indicia of said identified product consistent with movement of the identified product within the video content; and
    second, assigning a product information identifier to the identified product, said product information identifier being retrievable via any of the controlling parameters;
    to yield said outlined interactive element; and
    integrating said outlined interactive element with the video content, such that when the video content is displayed, the displayed video content includes the outlined interactive element therein,
    to yield said interactive content.

2. The method of claim 1 further comprising:
    incorporating an active link with the interactive element such that upon a user selection, the active link provides the viewer direct engagement in a commercial transaction relating to the product.

3. The method of claim 1 wherein the controlling parameters further comprise parameters describing the movement of the interactive element.

4. The method of claim 1 wherein the controlling parameters further comprise parameters describing advertising data associated with the interactive element.

5. The method of claim 4 wherein the advertising data includes one of an advertiser name, an advertiser bid price and advertiser billing information.

6. The method of claim 1 further comprising allowing advertisers to place bids comprising bid information on the interactive elements and associating the bid information with the interactive element.

7. The method of claim 1 further comprising monitoring user interaction with the interactive element.

8. The method of claim 7 wherein user interaction comprises at least one of the following: a mouse click, a mouse over and a mouse down.

9. A system for generating interactive content from video content, the system comprising:
    a plurality of client devices coupled to a network;
    a content server coupled to the network, the content server operative to transmit and receive data to and from the client devices;
    a video data store operative to store video data;
    an element extractor operative to identify at least one product within the video content to provide an identified product;
    an element generator operative to convert the identified product into an outlined interactive element within the video content by,
    first, assigning a plurality of controlling parameters to said identified product, at least one of said controlling parameters including curvilinear, form-fitting outline identification indicia of said identified product consistent with movement of the identified product within the video content, and;
    second assigning a product information identifier to the identified product, said product information identifier being retrievable via any of the controlling parameters;
    to yield said outlined interactive element; and
    a merger device operative to integrate said outlined interactive element with the video content, such that when the video content is displayed, the displayed video content includes the outlined interactive element therein, to yield said interactive content.

10. The system of claim 9, the element generator incorporating an active link with the interactive element such that upon a user selection, the active link provides the viewer direct engagement in a commercial transaction relating to the product.

11. The system of claim 10 wherein the controlling parameters further comprise parameters describing the movement of the interactive element.

12. The system of claim 10 wherein the controlling parameters further comprise parameters describing advertising data associated with the interactive element.

13. The system of claim 12 wherein the advertising data includes one of an advertiser name, an advertiser bid price and advertiser billing information.

14. The system of claim 10 wherein the content server is further operative to allow advertisers to place bids comprising bid information on the interactive elements and associating the bid information with the interactive element.

15. The system of claim 10 further comprising an interaction database operative to store user interaction data associated with the interactive element.

16. The system of claim 15 wherein user interaction comprises at least one of the following: a mouse click, a mouse over and a mouse down.

* * * * *